Patented Jan. 19, 1926.

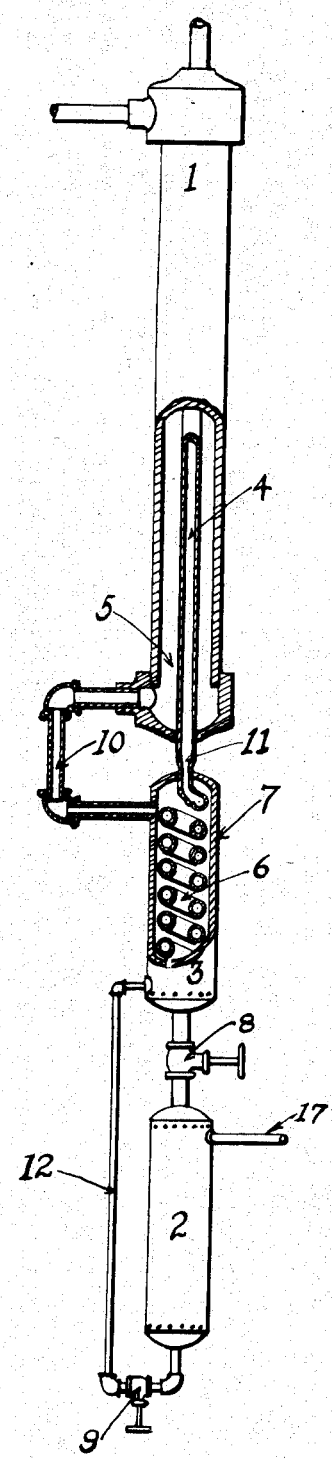

1,569,943

UNITED STATES PATENT OFFICE.

ROBERT ROGER BOTTOMS, OF LAKEWOOD, NEW JERSEY.

PROCESS FOR THE EXTRACTION OF HELIUM FROM GASES CONTAINING THE SAME.

Application filed December 27, 1924. Serial No. 758,338.

*To all whom it may concern:*

Be it known that I, ROBERT ROGER BOTTOMS, a citizen of the United States, and a resident of Lakewood, county of Ocean, State of New Jersey, have invented certain new and useful Improvements in Processes for the Extraction of Helium from Gases Containing the Same, of which the following is a specification.

Helium is separated from the natural gases in which it occurs by methods requiring the liquefaction of the greater part of the constituent gases of the natural gas, with the exception of the helium, and the separation of the still gaseous helium from the liquids thus produced. Such a method is made possible by the well known fact that nitrogen, oxygen, hydrocarbon gases and other gases which constitute from about 98% to more than 99% of the gases in helium bearing natural gas, liquefy at temperatures above minus 200 degrees centigrade, while the helium, which constitutes the other 2 per cent or less of the gas cannot be liquefied above minus 260 degrees centigrade. In order to attain the low temperature necessary to the liquefaction of the said oxygen, nitrogen and hydrocarbon gases of natural gas, it is necessary in all existing plants and processes for the separation of helium from natural gas to utilize adiabatic or engine expansion as a means of refrigeration, or, to separately and independently produce large quantities of liquid air or liquid nitrogen, which is then used to refrigerate and to condense to liquid the easily liquefiable constituents in the natural gas from which the helium is being separated.

The object of my invention is to attain the low temperature necessary to the separation of helium from helium bearing gases without the necessity of independently producing liquid air or liquid nitrogen, and without the necessity of employing auxiliary or external refrigeration of any kind.

The above named object of my invention is attained in the manner herein clearly described and as illustrated in the accompanying drawing.

The following is a description of my invention, reference thereto being had to the accompanying drawing. In the accompanying drawing, in order to avoid confusion, I have omitted showing heat insulation, or lagging, control apparatus, and other parts that are usual and regular equipment of apparatus for the liquefaction of gases.

The figure shows a diagrammatic view of the simplest embodiment of apparatus designed to accomplish the purpose of my invention.

Referring to like characters in the figure, (1) is a countercurrent heat interchanger containing gas passages (4) and (5), (2) is a liquid collecting pot. (3) is a condenser consisting of shell or tank (7) and gas passages, tubes or coils (6), (8) is a throttle valve, (9) is a liquid draw off valve, (12) is a pipe or tube for conducting liquefied gas from liquid collecting pot. (2) to tank (7) of condenser (3), (10) is a vapor return pipe to conduct vaporized gas from the condenser (3) to passages (5) of interchanger (1).

In the operation of the process forming the subject of my invention, helium-bearing gas, previously compressed to a pressure of 40 to 200 atmospheres, more or less, and freed of the greater part of its carbon dioxide and water vapor, is led into the apparatus through passages (4) of the heat interchanger (1), where it is cooled to a low temperature by a means that will shortly be more fully explained. The gaseous mixture passes from interchanger (1) through pipe (11) and enters tubes or coils (6) in condenser (3). Condenser tank (7) of condenser (3) is filled with the liquefied constituents of the natural gas boiling at approximately atmospheric pressure. It is this liquefied gas that forms the cooling or refrigerating medium necessary to liquefy the before mentioned easily liquefied constituents of the natural gas contained within tubes or coils (6), the said liquefaction being facilitated by the natural gas contained in tubes or coils (6) being at high pressure. The easily liquefiable constituents of the natural gas contained at high pressure within tubes or coils (6) condense to a liquid, holding the greater part of the helium in solution and in the liquid phase. From tubes or coils (6) the mixture of liquefied gases is passed to the liquid collecting pot (2) through the valve (8). In pot (2) the helium held in solution in the liquids is given off as a gas due to the reduction in pressure much in the same way that carbon dioxide is released from carbonated water upon release of pressure, the liquid gases and gaseous helium separate.

The liquid settles to the bottom of pot (2) while the helium, still at a pressure much above atmospheric, passes out of the pot through pipe (17) to the place where it is to be stored or used. The liquid, separating out in pot (2) is drawn off through valve (9) and transferred to condenser (3) through pipe (12) where it is allowed to evaporate at approximately atmospheric pressure. The vapors from the liquid in condenser (3) pass out through pipe (10) to passages (5) of interchanger (1) and thence through passages (5) countercurrent to the ingoing gases in passages (4) and thus give up their refrigeration to, and cool, the ingoing gases in passages (4) to a low temperature as previously stated. The said vapors in their passage from end to end of the interchanger (1) are warmed at the same time, to a temperature that approaches the temperature of the ingoing gases.

It is a fact, well known to physico-chemists that at normal atmospheric temperatures and below, all so-called permanent gases that condense to liquids at atmospheric pressure above minus 200 degrees centigrade, possess a greater amount of internal energy or heat energy at low pressures than at high pressures. This difference in heat content of gases with difference in pressure is due to the latentizing of heat in the separation of the molecules of the gas against the mutual attractive forces of the molecules and to the slight separation of the atoms within the individual molecules.

My process consists essentially in utilizing the above described difference in heat content between the gases at high pressure entering the apparatus and the gases at low pressure leaving the apparatus—the two gas streams being at approximately equal temperatures at this point. It is thus possible, with my invention to liquefy and to separate the gases condensible to liquids above minus 200 degrees centigrade, from the helium contained in natural gas by utilizing as the cause of a refrigerative effect the difference between the total heat content of the said gases at high pressure and at low pressure, and without the employment of adiabatic expansion or of other refrigeration of any kind.

In thus making use of the difference in the heat content of gases at high pressure and at low pressure for obtaining the refrigeration necessary to separate helium from natural gas, completely reducing the constituent gases to the liquid phase, including the greater part of the helium, before reduction of pressure is made, I utilize a totally new principle in the art of extracting helium from gases containing the same. It should be specifically pointed out here that the liquid gases passing from coils (6) through valve (8) to pot (2) do not undergo an expansion in the sense that the volume increases, and also do not undergo a reduction in temperature at this point, since the constituent gases are already liquids and at the minimum temperature reached in the process, having been reduced to this temperature by the liquids boiling at atmospheric pressure surrounding coils (6) in condenser (3). Therefore, it is seen that the refrigeration necessary to maintain the low temperature is not the result of the well known Joule-Thomson effect as utilized by others (see U. S. Patent 1,272,059) in which the gases in the gaseous state undergo an expansion in volume upon release of pressure, and suffer a drop in temperature thereby.

Having thus described my invention what I point out and specifically claim as new and desire to secure by Letters Patent is:

The process of separating helium from gaseous mixtures containing the same consisting in conducting the compressed gaseous mixture through one series of passages in a countercurrent heat interchanger and thence into a condenser where the constituents of the said gaseous mixture including the greater part of the helium present, at high pressure is reduced to the liquid phase, and to the minimum temperature reached in the process; reducing the pressure by passing the resulting liquids through a throttle valve into a liquid collecting pot, where the dissolved helium is released, passes into the gaseous phase and is withdrawn; passing the liquids into a condenser, re-evaporating the said liquids to the gaseous phase, and passing the re-vaporized gases out of the apparatus through a second series of passages in the aforementioned countercurrent heat interchanger at low pressure, substantially as set forth in the foregoing specification.

R. R. BOTTOMS.